United States Patent
Wechter et al.

(10) Patent No.: US 9,128,481 B2
(45) Date of Patent: Sep. 8, 2015

(54) INTEGRATED MENU-DRIVEN MANUFACTURING METHOD AND SYSTEM

(75) Inventors: David Wechter, Menomonee Falls, WI (US); John C. Boetcher, Richfield, WI (US); Matthew P. Garrison, Menomonee Falls, WI (US); Daryl J. Muma, Wauwatosa, WI (US); James A. Carter, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1214 days.

(21) Appl. No.: 12/688,530

(22) Filed: Jan. 15, 2010

(65) Prior Publication Data
US 2011/0178627 A1 Jul. 21, 2011

(51) Int. Cl.
G06F 17/00 (2006.01)
G06F 3/048 (2013.01)
G05B 19/418 (2006.01)

(52) U.S. Cl.
CPC *G05B 19/41875* (2013.01); *G05B 2219/32177* (2013.01); *G05B 2219/32179* (2013.01); *G05B 2219/32214* (2013.01)

(58) Field of Classification Search
CPC ........... G05B 2219/32179; G05B 2219/32177; G05B 2219/32214; G05B 19/41875; G05B 19/41865; G05B 19/4187
USPC ............ 700/17–20, 83, 108–111; 702/81–84, 702/182–186; 340/3.1, 3.4–3.44, 3.7, 3.71; 715/965
See application file for complete search history.

(56) References Cited

U.S. PATENT DOCUMENTS

| | | | | |
|---|---|---|---|---|
| 4,958,297 A * | 9/1990 | Hansen | ........................ | 715/723 |
| 5,088,045 A * | 2/1992 | Shimanaka et al. | .......... | 700/110 |
| 5,631,825 A * | 5/1997 | van Weele et al. | ............. | 700/83 |
| 6,385,739 B1 * | 5/2002 | Barton et al. | ................... | 714/25 |
| 6,396,516 B1 * | 5/2002 | Beatty | ........................... | 715/764 |
| 6,775,584 B1 * | 8/2004 | Huang et al. | ................... | 700/121 |
| 7,103,444 B1 * | 9/2006 | Reitmeyer et al. | ............. | 700/180 |
| 7,275,236 B1 * | 9/2007 | Kabe | ............................. | 717/106 |
| 7,444,201 B2 * | 10/2008 | Dirnfeldner | ................... | 700/180 |
| 7,515,981 B2 * | 4/2009 | Ryznar et al. | .................. | 700/95 |
| 7,580,769 B2 * | 8/2009 | Bowman et al. | ............... | 700/179 |
| 7,650,982 B2 * | 1/2010 | Tachibana et al. | ........ | 198/341.01 |
| 7,676,294 B2 * | 3/2010 | Baier et al. | ..................... | 700/108 |
| 8,027,745 B1 * | 9/2011 | Freeze | ........................... | 700/106 |
| 2001/0013832 A1 * | 8/2001 | Chavand | ........................ | 340/679 |
| 2002/0029092 A1 * | 3/2002 | Gass | ............................. | 700/116 |
| 2003/0163219 A1 * | 8/2003 | Flesher | ........................ | 700/185 |
| 2004/0249606 A1 * | 12/2004 | Hoppes et al. | ................. | 702/183 |
| 2004/0250108 A1 * | 12/2004 | Parsons et al. | ................. | 713/200 |
| 2009/0326699 A1 * | 12/2009 | Coffland et al. | ............. | 700/108 |
| 2010/0256793 A1 * | 10/2010 | Lee et al. | ....................... | 700/108 |

FOREIGN PATENT DOCUMENTS

JP 03111181 A * 5/1991 ............... B25H 3/00

* cited by examiner

*Primary Examiner* — M. N. Von Buhr
(74) *Attorney, Agent, or Firm* — Fletcher Yoder, P.C.

(57) ABSTRACT

A menu-driven manufacturing technique includes determining a product and product configuration, along with process steps to be carried out in manufacturing workstations. Display screens corresponding to the particular manufacturing process steps are accessed and displayed on monitors at the workstations to lead operators through the processes. Control circuitry may verify that the correct components and tools are utilized as called for by the various process steps. Powered tools and test setups may be integrated with the system to enable improved quality control.

25 Claims, 8 Drawing Sheets

INTEGRATED MENU-DRIVEN MANUFACTURING METHOD AND SYSTEM

BACKGROUND

The present invention relates generally to the field of manufacturing systems, and more particularly to a menu-driven system that facilitates operator direction and quality control.

A wide range of manufacturing systems have been developed and are presently in use. Many such systems employ automated machinery to accomplish assembly steps. However, many processes still require at least some of the manufacturing or assembly to be performed by human operators. Training and control of the operators is often a challenge, requiring various simple steps as well as some highly skilled manufacturing techniques. The training and control challenges in manufacturing are particularly pronounced where multiple products are manufactured on a single production line, or where variations in product configuration may be accommodated on a single manufacturing line. Operators may be confused by the various configurations for individual products, and may need to consult with manufacturing instructions, catalogs, and so forth. In many cases, specific product configurations are manufactured in certain "runs", with generally identical or quite similar products being made in each run. When different product configurations are to be accommodated, then, a new product run is scheduled.

Manufacturing techniques are also challenged by the control of the flow of components and the control of automated tools used by operators. For example, depending upon the product configuration, various mechanical, electrical, chemical or other components may be required, and these must be supplied in an orderly fashion at the appropriate point in the manufacturing process. Tools, such as machine tools, hand tools, and the like may be used in the manufacturing process, and these may be adapted or adaptable for the particular components utilized (e.g., a type of screw or fastener), as well as for the component or components being assembled. Various approaches have been used for such controls, but few allow for smooth control and regulation of component supply and tool control that facilitate interaction by the operator.

Another challenge with automated or semi-automated manufacturing techniques is the tracking of progress through the manufacturing process, as well as of parts that go into a particular product and operators who perform the manufacturing processes. Evaluation of reliability, root causes for failure, and general quality control are greatly facilitated if accurate tracking of components integrated into a product is available. However, few manufacturing systems provide for a cost-effective and simple mechanism for tracking such information.

There is a need, therefore, for improved manufacturing techniques that can address the limitations of existing systems. There is, particularly, a need for systems that can allow for providing instructions to operators throughout the manufacturing processes so as to facilitate the process flow and allow for adaptation of the processes to various product configurations.

BRIEF DESCRIPTION

The present invention provides novel manufacturing techniques designed to respond to such needs. In presently contemplated embodiments, the techniques may be adapted for use on one or more manufacturing lines that comprise a plurality of manufacturing workstations. Each workstation may be adapted for performing one or more manufacturing operations, such as assembly processes. A controller is coupled to sensors at the manufacturing workstations and serves user-viewable screens to monitors at the workstations, to lead the operators through the various manufacturing operations. The workstations may allow for detection of individual assemblies, product configurations, components, tools, and so forth that can all be detected, controlled and logged by the system controller.

The control system may include an overall system controller and one or more tool controllers. The tool controllers may interface with powered tools so as to enable the tools when a particular manufacturing process calling for the tools is to be performed. The tool controller may also regulate operation of the tool, such as to allow for specific defined parameters (e.g., torque for a fastener operation). The system controller and the tool controllers may be integrated into a single unit, or these may be provided separately.

In the presently contemplated embodiments, the process is facilitated by the provision of a series of user viewable screens on the displays at each manufacturing workstation that lead the operation through the various manufacturing steps, test sequences, and so forth. The operator may interactively interface with the screens as the various manufacturing processes are taken on and accomplished. The overall system therefore provides for greatly facilitated learning and quality control, as well as for tracking of individual components, assemblies, and operator actions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
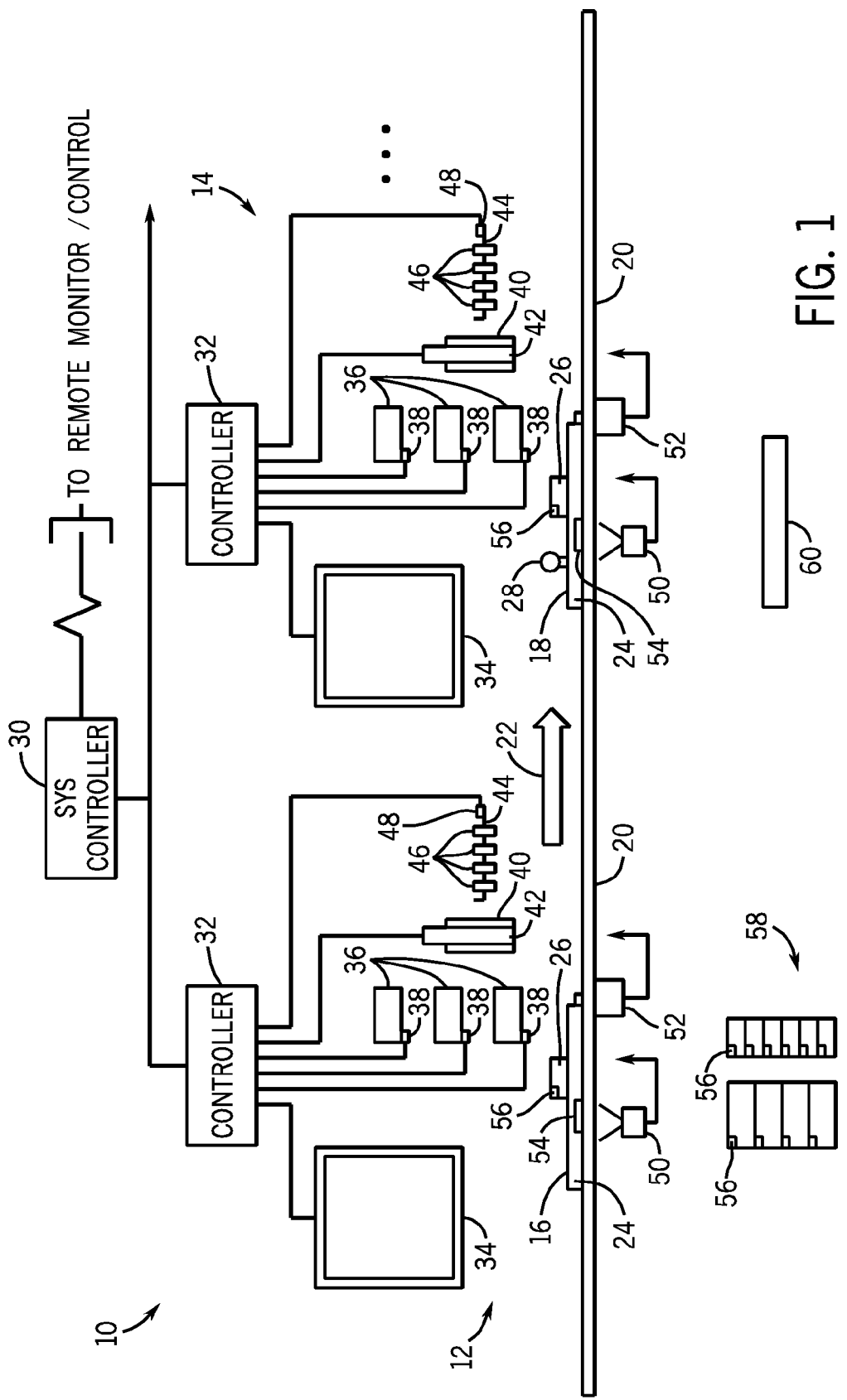
FIG. 1 is diagrammatical overview of an exemplary manufacturing system in accordance with aspects of the present techniques.

FIG. 1 illustrates an exemplary manufacturing system designated generally by reference numeral 10. The system may be used to manufacture any suitable product, such as mechanical devices, electrical devices, electro-mechanical devices, for packaging of products, and so forth. The term "manufacturing" as used herein should be considered to include component assembly, component machining, device configuration, positioning or deposition of solid, liquid or gas materials, and so forth. In the exemplary embodiment illustrated, for example, an electro-mechanical device is assembled, in the form of a power electronic device such as a motor drive. However, it should be understood that this is merely one example of the many different products that may be handled in accordance with the techniques described in this disclosure.

The manufacturing system 10 is illustrated as including manufacturing workstations 12 and 14, which may be two of many such workstations along a manufacturing line. The line may, in fact, be linear insomuch as one or more conveyors moves products from one position to the next, although any physical configuration for the various lines may be envisaged. For example, products may be moved between adjacent lines, to adjacent or remote locations, and even to separate facilities. In the embodiment illustrated, the workstations are adjacent to one another and define product manufacturing stages designated generally by reference numerals 16 and 18. At each of the stages a support 20 is provided for the product being assembled, in this case a continuous conveyor. The conveyor may be powered to unpowered, and may include conventional rollers, belt supports, and so forth. Arrow 22 indicates a direction of progression of the manufacturing process, with the product positioned at workstation 14 being at a more advanced stage than the product positioned at workstation 12. At each of the product stages, a pallet or carrier 24 is provided in the illustrated embodiment for supporting the product being assembled. In the case of a power electronic device, for example, a rigid synthetic or metallic support particularly configured to receive and position a substrate, one or more circuit boards and the like may be used for the pallet or carrier. The use of a pallet or carrier facilitates the movement of the product from one position to the next, although the product structure itself may serve this purpose (e.g., a support armature, frame, or the like).

In general, various components may be added at each station, or manufacturing operations may be performed on existing components, including fastening, positioning, curing of adhesives, testing, and so forth. In the illustrated embodiment, a component 26 has been added at workstation 12, while a further component 28 has been added at workstation 14. In practice, a number of components may be added at each workstation as defined by a predetermined manufacturing protocol or program executed by the manufacturing system.

The workstations are coupled to a control system that can sense various signals provided by the components of the workstations as described below, and that can control certain operations, particularly of powered tools. The control system is also designed to access product configurations, and instructional display screens corresponding to the configurations and to various manufacturing stages, and to serve the display screens to each workstation for viewing by the manufacturing operators. In the illustrated embodiment, the control system includes a system controller 30 that is linked to individual controllers 32 which may be workstation controllers, tool controllers, and so forth. The system controller 30 may be further linked to various remote monitoring and control systems, such as for downloading from a remote location manufacturing programs, component parameters, orders for products, and so forth, and for uploading to a remote location information relating to the manufactured products, their process through the system, success or failure of various processes and tests, and so forth. The remote connections may be based upon any suitable protocol, such as existing industrial data exchange protocols, Internet protocols, and so forth.

Monitors 34 at each workstation provide for the display of the user-viewable screens that lead the operator through the manufacturing processes. These displays may be interactive, allowing for touch interaction with the operator, or other input devices may be provided, such as a stylus, a pointer, a conventional mouse, a keyboard, and so forth. Moreover, the displays may be connected to the controllers 32 as illustrated, or directly to a system controller 30. In more complex manufacturing systems, two or more system controllers 30 may be provided at different points in the manufacturing process, and even in different facilities.

Various holders, positioning devices, storage racks and so forth may be provided at the workstations depending upon the manufacturing processes envisaged. Moreover, these may be associated with sensors that may provide detailed information to the controllers 32 or the system controller 30 to inform the controllers at which stages of the manufacturing process the products are situated and thereby to allow the proper user-viewable screens to be displayed. In the illustrated example, for example, these systems include bins 36 which may hold individual components or parts. These bins may be associated with sensors or detectors 38 that provide an indication that various parts have been accessed, bins have been moved to particular positions for access to components, and so forth. As also illustrated, one or more holders may be provided as indicated at reference numeral 40 for various tools, such as powered tools 42. In the example illustrated, the powered tool 42 may be a motor-driven screwdriver that can be used for various fasteners, depending upon the manufacturing program. Other holders 44 may be provided for other tools or attachments 46, such as for a particular tips or attachments for the powered tools. One or more sensors 48 may be associated with these, such as to ensure that an operator has secured the appropriate attachment to the powered tool before it is enabled for a particular manufacturing step.

Other sensors currently envisaged may include a product or pallet detector 50 which, as illustrated, may be positioned below, beside or above the product or product support. Such detectors may allow for the scanning of barcodes, radiofrequency tags, and the like to identify particular products, product configurations, special orders, and the like. In the illustrated embodiment, a radio frequency tag 54 is associated with the pallet or carrier and this identification is used throughout the manufacturing process to drive the access and delivery of process-specific instructional screens to the displays. Other positions, configurations, and technologies may be used for a similar end.

In addition to the foregoing, the illustrated embodiment includes a positioning device at each workstation as indicated by reference numeral 52. In a presently contemplated embodiment, the positioning device includes a remote-control stop or positioner which may rise, fall, or otherwise change positions to interact with the pallet or support, or with the product directly. This may be used to stop the product at a particular location for the manufacturing processes envisaged at the workstation, or may be subsequently controlled to allow the product to advance to the next workstation. Various other component tags 56 may be associated with individual components, particularly those which are to be tracked as the manufacturing process advances. In the illustrated embodiment, for example, various components may be stored below the support 20 in a stock 58. These may be, in practice, advanced in various inclined lines, racks, component supports, component packaging, and so forth. Where appropriate, smaller components may be provided in trays 60 as indicated below manufacturing workstation 14.

Figure 2:
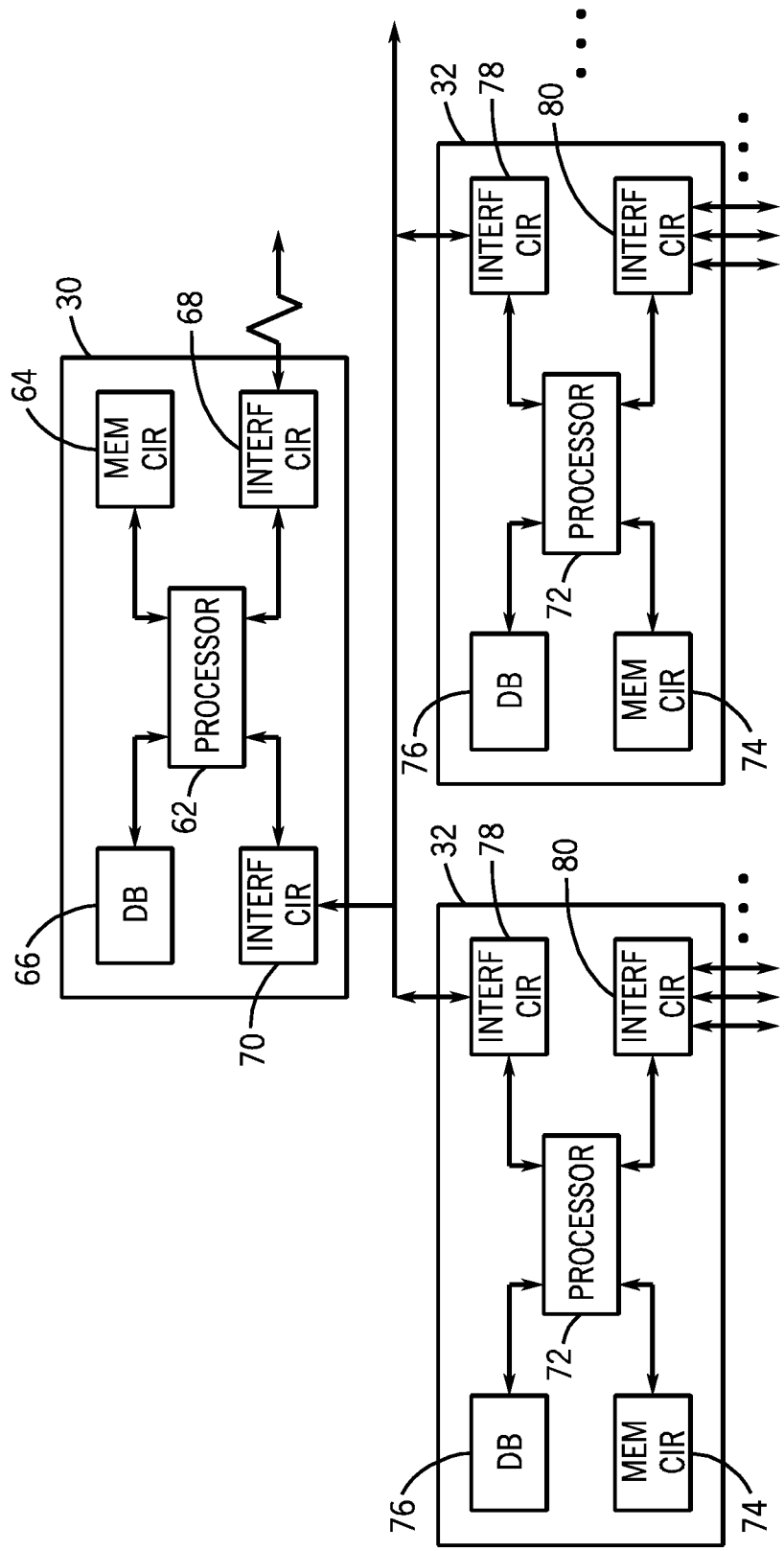
FIG. 2 is a diagrammatical representation of certain functional components of and exemplary system controller and exemplary tool controllers.

The control system described above may be based upon any suitable platform, and will typically include one or more general purpose or application-specific computers. FIG. 2 illustrates certain exemplary components which may be included in these computers. For example, system controller 30 will typically include one or more processors 62 that carry out the programmed operations to prompt the manufacturing processes, and to control and log these processes. Any suitable processor may be employed, including conventional microprocessors, field programmable gate arrays, and so forth. The processor will be associated with one or more memory circuits 64, such as solid state or magnetic memory, optical memory devices, and so forth. A database 66 may be provided in the memory circuitry 64 or separately. As described more fully below, the database will include the product configurations, as well as the various instructions for accessing and serving user-viewable screens to the displays of the workstations. In practice, many different product configurations may be accommodated in the same assembly line, and separate screens may be accessed from the database based upon the product configuration selected for an individual product, customer options selected, and so forth. An interface circuit 68 will typically be provided where remote monitoring and control are desired. The interface circuit 68 may allow for interfacing with local area networks, wide area networks, or any other network configuration, and may be designed for wired or wireless communication. Similarly, an interface circuit 70 is provided for interfacing with the individual controllers for the workstations. It should be noted that interface circuits 68 and 70 may operate on the same or a different protocol. Where the protocol is identical, a single interface circuit may suffice. Moreover, where the individual controllers 32 are integrated into a single controlled device or computer, much of the redundancy illustrated in FIG. 2 may be avoided, and instructions provided directly to from the single controller, with sensor detected signals being provided back to the single controller.

The illustrated embodiment includes separate controllers which may be specifically adapted for the control of powered tools, such as screwdrivers, motors, electrical test devices, electrical charging devices, lights, indicators, and so forth. In the illustrated embodiment, each such controller includes its own processor 72 which again may be any suitable device, such as a microprocessor, field programmable gate array, and so forth. A memory circuit 74 is provided in each controller for storing the instructions executed by the processor 72. Moreover, individual databases 76 may be provided in each controller that store program sets that may be called upon and executed for the control of the various tools or actuators enabled and controlled by the controllers 32. The interface circuit 78 of each controller is provided for interfacing with the interface circuit 70 of the system controller 30. In a presently contemplated embodiment, these interface circuits may communicate through an industrial data exchange protocol, although any suitable protocol, including Internet protocols may be employed. Finally, various interface circuits 80 may be provided for receiving inputs from the various workstation sensors and for providing power and control signals to various actuators. The interface circuits may include analog-to-digital converters, power relays, circuits for controlling torque, speed, position, or any other parameter useful for the manufacturing process.

Figure 3:
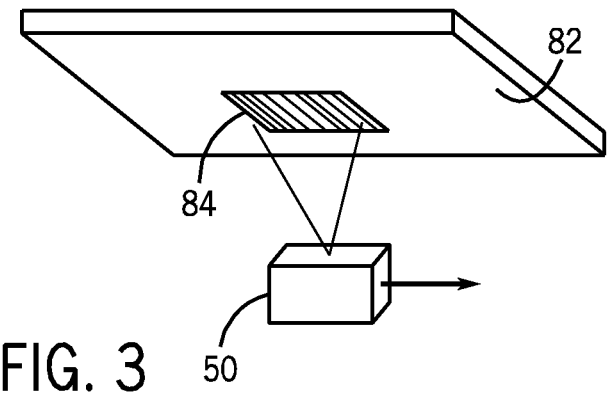
FIG. 3 is a diagram of an exemplary product support adapted to have identification data (e.g., from a tag) detected by a scanner or reader.

Various physical configurations of the devices, sensors, detectors and actuators may be envisaged. FIGS. 3, 4, 5 and 6 illustrate certain presently contemplated arrangements. For example, as shown in FIG. 3, a product or pallet detector 50 is positioned beneath a pallet or product support 82. A tag, such as a radio frequency tag 84 is provided on the support and can be scanned by the detector 50 to provide an indication of the product support which, in turn, may be used as an indication of the particular product or product configuration mounted on the support and presently under assembly. As noted above, other arrangements can be envisaged, particularly for the use of product-identifying tags, such as radiofrequency tags.

Figure 4:
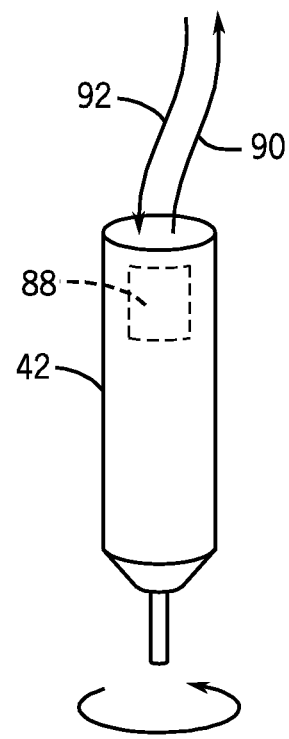
FIG. 4 is a diagrammatical view of a powered tool, such as a screwdriver, that may be controlled by the system.

As shown in FIG. 4, various actuators and powered tools may be utilized, such as a powered screwdriver. As will be appreciated by those skilled in the art, such devices typically include a housing and one or more adaptors for receiving various attachments. The housing encloses an electric motor which may be powered to drive the attachment and rotation. In the illustrated embodiment, the tool includes one or more sensors 88 which may sense the angular position of the attachment, the speed, the torque, and so forth. An operator may grasp the tool and use the attachment in a manufacturing operation, such as for securement of a fastener. Data may be acquired from the one or more sensors by a data conductor 90, while power is provided to the tool by one or more power conductors 92. In practice, data may be superimposed upon power in accordance with conventional techniques. Moreover, the power provided to such tools may be regulated depending upon the parameters of the manufacturing operation. For example, the power may be disabled when the tool is not needed for a particular manufacturing operation, and power provided only when the tool is properly configured and needed for the operation. Similarly, power may be disabled when it is detected that an improper attachment is on the device (e.g., by reference to sensor inputs from the attachment support or holder). Similarly, power provided to such tools may be regulated so as to provide desired torques, forces, angular positions, and so forth.

Figure 5:
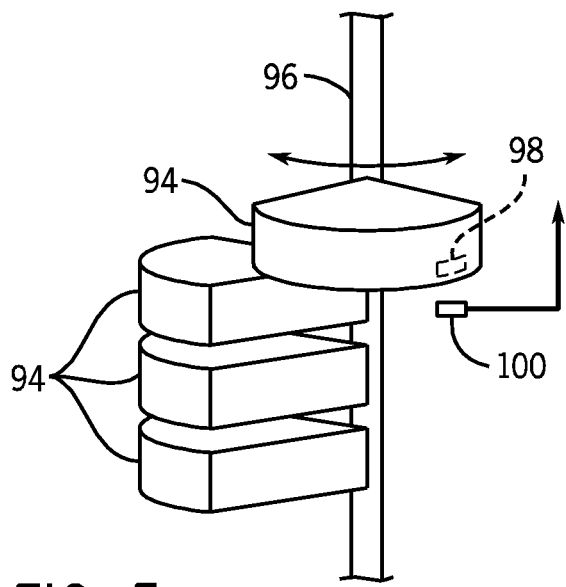
FIG. 5 is a diagrammatical view of a component delivery system, such as for small component parts.

FIG. 5 illustrates an exemplary configuration for small component bins, of the type that may be used for fasteners, electrical components, small mechanical parts, and so forth. In this illustrated embodiment a number of bins 94 are mounted on a support post or rail 96. The bins may pivot into and out of access positions. Tags, metal coupons, or any suitable detectable element 98 may be associated with each bin, such as to allow the bin to be detected by a sensor 100. Such detection may be used to provide feedback to the system indicating that the appropriate bin is selected by an operator for the desired component utilized in a particular manufacturing process. In addition, the detection feedback can be used to enable and/or disable powered tools utilized in a particular manufacturing process.

Figure 6:
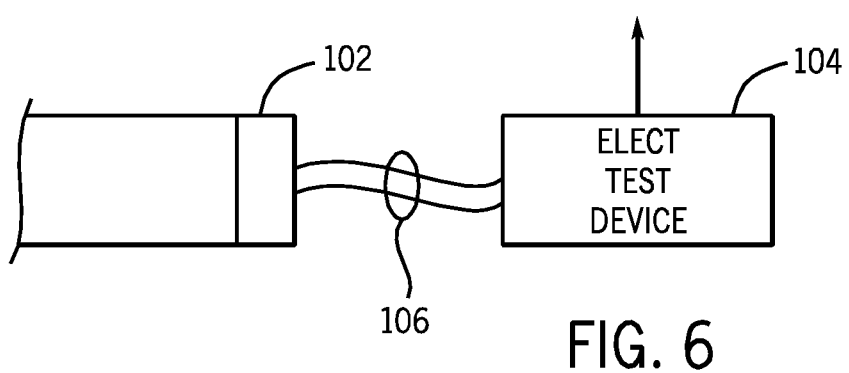
FIG. 6 is a diagrammatical view of an electrical test setup.

Still further, FIG. 6 illustrates an exemplary electrical test setup. As noted above, various mechanical, electrical, chemical and other tests may be provided for at the various workstations. Such tests may enable detection of proper electrical termination of devices, their direction of rotation, their operational status, and so forth. Similarly, test setups may be provided for detecting dimensions, appropriate positioning, spacing between components, polarity, pressures, and so forth. These typically will be programmed into the system controller or the one or more workstation controllers and referred to in particular manufacturing steps to indicate that a manufacturing subprocess has been successfully or unsuccessfully performed. In the arrangement illustrated in FIG. 6, for example, a motor 102 is mounted on a product and positioned adjacent to electrical test device 104. Electrical test device may, for example, be coupled to the motor by leads 106 and provide signals to the motor for determining its proper termination, direction or rotation, operability, and so forth.

Figure 7:
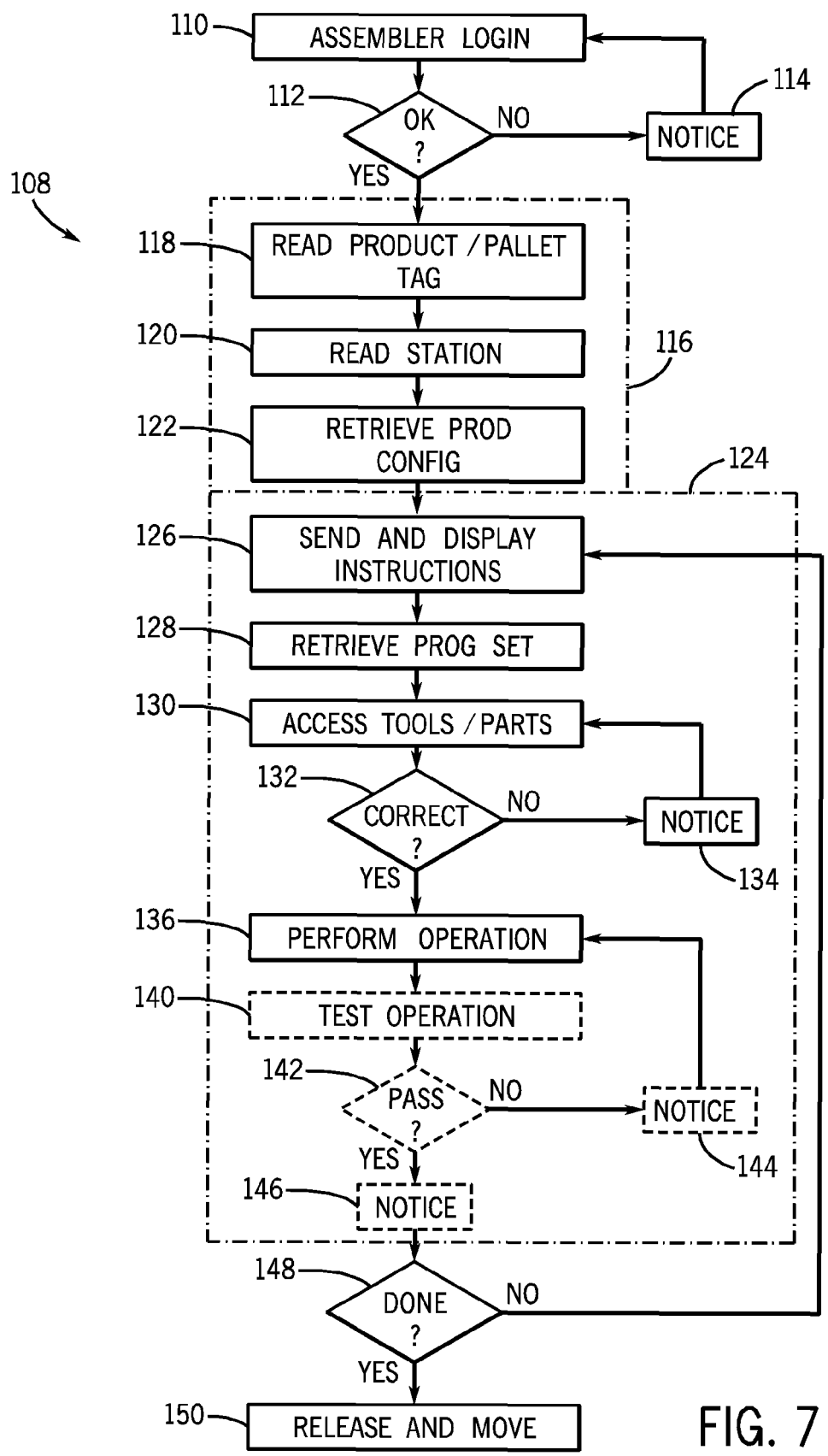
FIG. 7 is a flow chart illustrating exemplary steps in a presently contemplated technique for interactive manufacturing or assembly.

As noted above, many different manufacturing operations may be performed utilizing the present techniques. By way of example only, an assembly operation may include a range of product identification steps, program access steps, operator direction steps, test sequences, and so forth. FIG. 7 illustrates an exemplary process that may utilize such steps for an assembly operation and that may be employed with the workstations described above. The process, designated generally by reference numeral 108, begins with step 110 where an operator logs into the system. The operator login will typically include input of a username, password, or similar information that limits access to the system and that logs the particular operator who is working at a workstation. As indicated at step 112, if the login is successful the process may continue. On the contrary, if the login is not successful (e.g., the information entered was erroneous, the person is not recognized, the person is not properly trained or otherwise able to perform the steps required at the workstation) a notice is provided as indicated at step 114, and the operator may reattempt the login.

The steps that follow may be subdivided into phases of operation. For example, in the embodiment illustrated in FIG. 7, a first phase 116 involves determining the particular product and/or product configuration, and retrieving information for the manufacturing process at one or more workstations. For example, as illustrated at step 118, a product or pallet tag may be read as described above. This step will typically involve not only the reading of the tag but retrieval, comparison, or other association of the data resulting from reading the tag with information stored in the control system (e.g., the system controller or a tool controller). As noted above, a wide range of products and product configurations may be accommodated in a single assembly line, and specific instructions, parameters, components, assembly steps, and so forth may be accessed for specific products. At step 120, the station is read. This process may be automatic, such as by association of a particular reader with a particular workstation, or may require actual detection of the particular workstation. In general, this too will involve comparison of the read information with a list of workstations and process steps that are required for the particular workstation. Based upon this information, as indicated at step 122, product configuration information is retrieved. As noted above, this information may be retrieved from one or more databases, one or more memory circuits, both of the system controller and of the tool controllers. Moreover, the product configuration information, where desired, may be retrieved from remote sources coupled to these by a network.

Following identification of the particular product, product configuration, and workstation, the manufacturing process may follow a number of steps as indicated generally by reference numeral 124. For example, as indicated at step 126, the system will send and display instructional pages or display screens to each workstation that assist in leading the operator through the manufacturing steps. These instructional pages will typically be provided in the form of display screens as described more fully below. Such display screens may include certain product information, operator information, date, time, and other metadata or biographical information. Moreover, specific instructions may be provided along with illustrations of how the assembly is to proceed. As also noted above, these may be stored in one or more databases and retrieved based upon the product information, the product configuration information, and the workstation information so as to appropriately lead the operator at the multiple workstations through the desired manufacturing steps.

In addition to the display screens, the system may retrieve certain program sets as indicated by reference numeral 128. These program sets may be specific to the tool controllers such that specific tool operations will be enabled and controlled based upon the program sets. For example, the program sets may define such information as particular attachments for powered tools, a number of rotations of fasteners, a desired final position of a fastener, a torque to be applied to a fastener, and so forth. Based upon these program sets and upon the steps to be carried out at the manufacturing workstation, then, an operator may access particular parts as indicated at step 130. Various forms of detection of the proper access to the parts may be carried out, such as by reference to bin sensors, part scanning, part code entry, and so forth, as described above. As indicated at step 132, the system may determine whether the correct component or part has been selected by the operator and if not, provide a notice to the operator as indicated at step 134. In such cases, the control system may also disable any powered tools required for the operation. Once the correct part or component is selected, the operator performs the manufacturing operation as indicated at indicated at step 136. As noted above, a wide range of operations may be performed, including assembly, component mounting, component removal, electrical component termination, mechanical component linkage, securing of various components, addition of liquids or gasses, and so forth.

In certain applications and for certain process steps, testing may be required. As noted above, such testing may be intended to demonstrate that components have been properly positioned, mounted, or that certain assembly parameters have been met, such as torques on fasteners, and so forth. As indicated at optional step 140 in FIG. 7, where such testing is to be performed it will typically be done after the manufacturing operation. As indicated at step 142, the system may detect whether the test is successful, such as by reference to a test target parameter or range stored within the control system. If the test is unsuccessful, a notice may be provided as indicated at step 144 and the operator may be prompted to correct the problem by re-performing certain manufacturing operations. Where such tests are performed and the results are positive, a notice may also be provided as indicated at step 146 indicating the successful results.

The process described above may continue through a number of process operations, depending upon the product, the product configuration, and the number and type of operations to be performed at any particular manufacturing workstation. As indicated at step 148, then, it may be determined whether the particular operations at a particular workstation have been completed, and if not, the flow may return to step 126 where additional user-viewable display screens are retrieved for display, along with any applicable program sets. Once all operations have been completed, the product may be released and moved at step 150, such as from the assembly process when complete, or to another manufacturing workstation for additional operations.

The process may include a variety of additional steps and operations not represented in the figure. These will typically depend upon the type of product or manufacturing (e.g., assembly) being performed, and downstream processing, record keeping and so forth that may be desired. For example, the system may provide for integration of "print-on-demand" operations and hand shaking with the test systems and other functional (e.g., software) components. In such operations, nameplates, carton labels, manufacturing labels, shipping labels and so forth may be prepared, such as by printing, based on the operations performed, test result data, and so forth. Moreover, while not represented specifically above, the process may integrate cameras into the line or into one or more of the workstations. These may be used to collect and transmit real time images, or to store images, of the operations performed. Such images may be used to verify product identifications, and may serve quality control functions such as monitoring for compliance with indicated manufacturing steps and operations.

Figure 8:
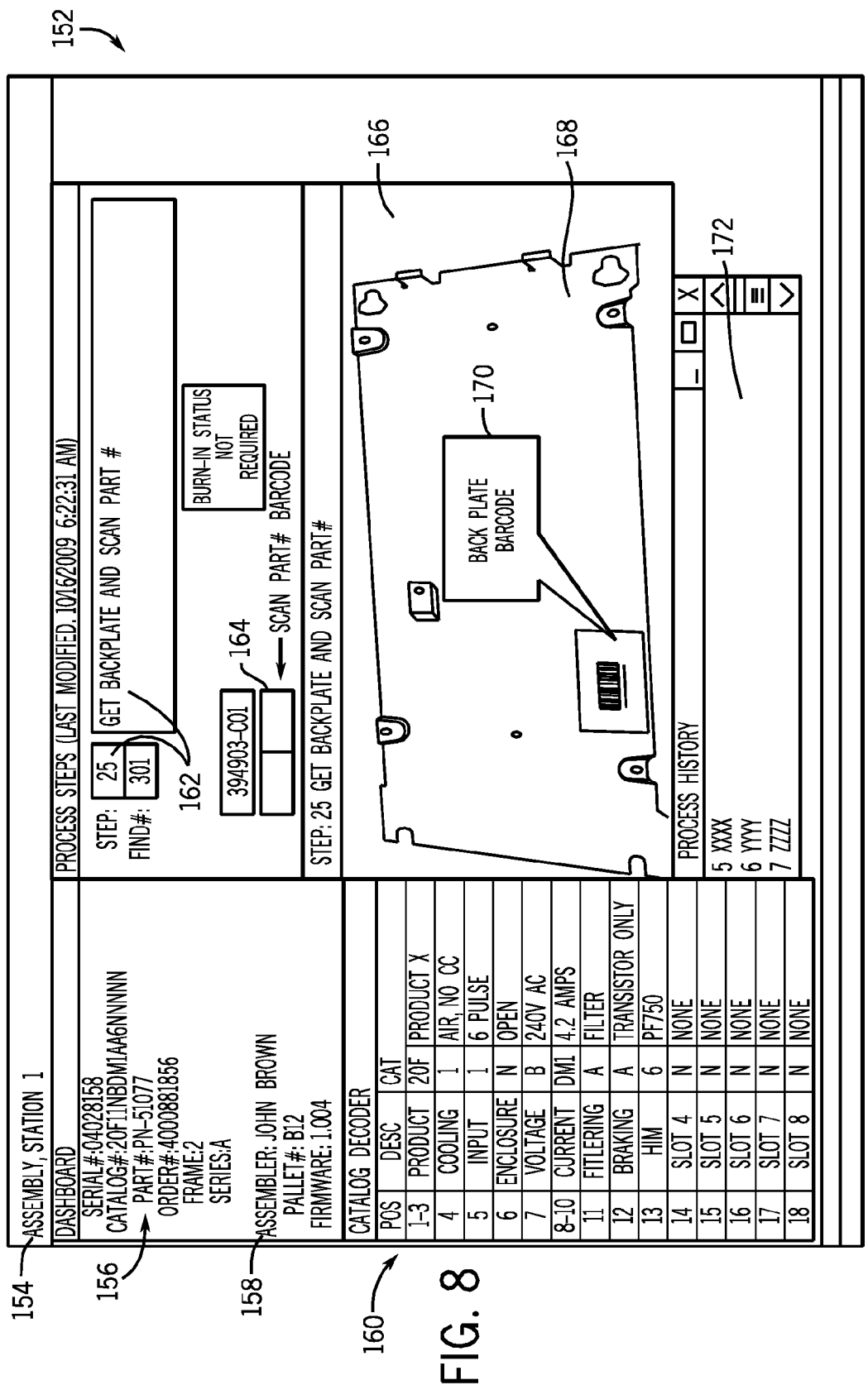
FIGS. 8-11 are exemplary display screens that may be presented at individual workstations for carrying out pre-programmed manufacturing operations.

FIGS. 8-11 illustrate exemplary display screens of the type that may be displayed for various operations described above. For example, screen 152 shown in FIG. 8 is intended to be displayed on a digital monitor at a manufacturing workstation and provides certain metadata regarding the product, as well as certain biographical information, component information, and so forth. In the illustrated embodiment, the display screen first indicates the particular station at which the product is situated as indicated by reference numeral 154. Based upon scanning of the product support or the product itself, then, additional information may be provided regarding the specific product as indicated at field 156. This information may include, for example, a serial number, catalog number, part number, a specific customer order number, and so forth. As indicated at reference numeral 158, other information may be displayed, such as the authorized assembler, any relevant information regarding the date or process, and so forth. Finally, as indicated at reference numeral 160, certain particular part information may be retrieved and displayed, such as for individual components and portions of components that may be referenced in the manufacturing process.

The display screen may also preferably include directions for the operator to facilitate the manufacturing operations. As indicated by reference numeral 162, for example, process steps are indicated sequentially in this embodiment, along with textual information regarding the process to be carried out by the operator. In the illustrated embodiment, for example, a step "25" is carried out in which the operator should obtain a backplate and scan a part number. Various fields may be provided in the screen display to indicate these relevant data, such as a scanned part number or barcode as indicated at field 164 in the illustration. In a presently contemplated embodiment, the display screens also include a pictorial representation of the manufacturing operation to be carried out. For example, a pictorial window 166 is provided in which, in this case, a backplate 168 is illustrated. Such illustrations may be derived from actual photographs of the component parts at a workstation. Textual or graphic clues may also be provided that clearly indicate to the operator what is to be performed. In the illustrated example, for example, a text balloon 170 is provided illustrating where the operator is to find a barcoded tag that should be scanned.

Finally, the display screens may list certain process history as indicated generally by reference numeral 172 in FIG. 8. This process history may enumerate various process steps that have been successfully performed, including textual indications of the particular step, whether the step has been performed, whether the step has been successfully performed, along with time, date, operator information, and so forth where desired.

Figure 9:
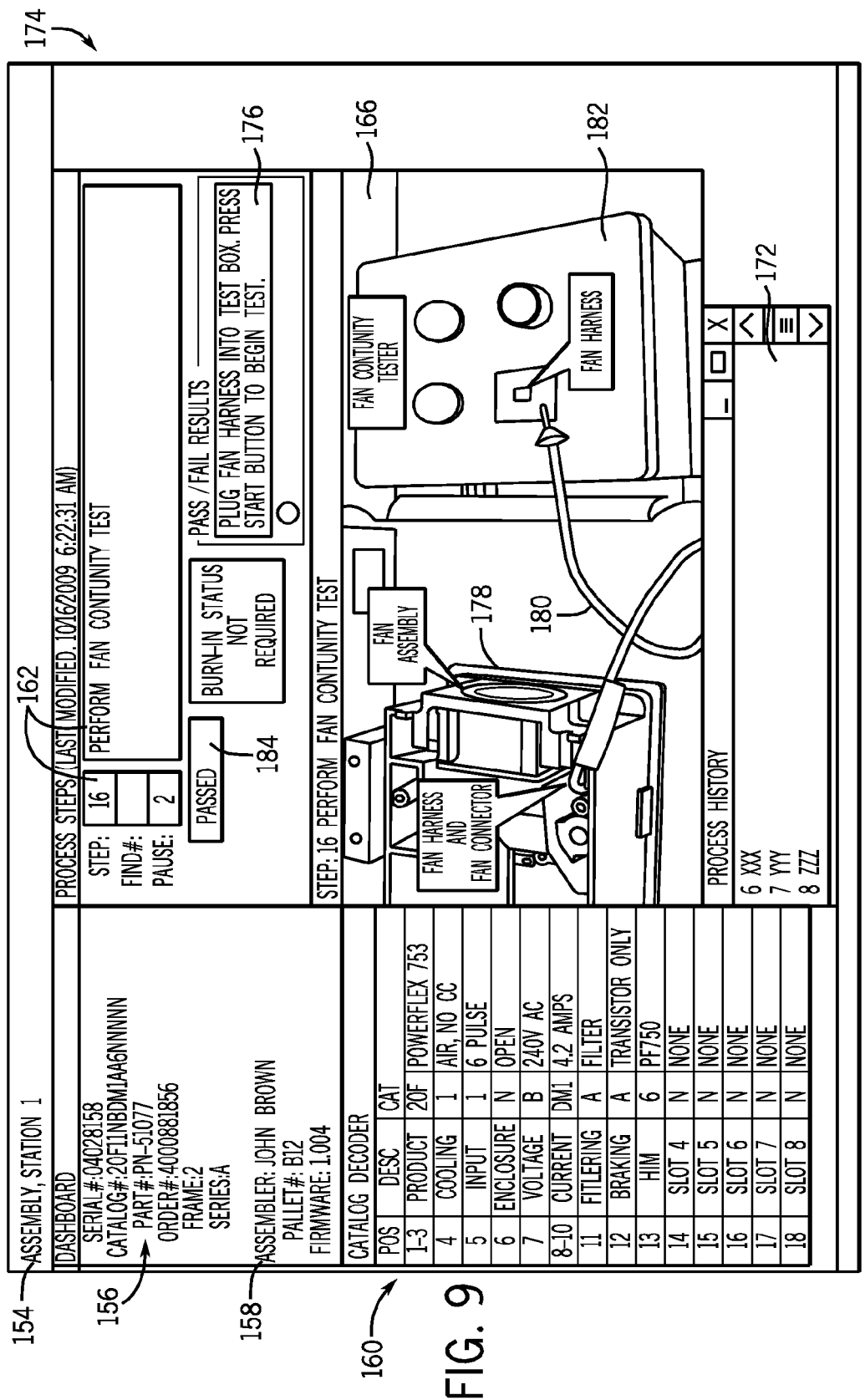

As discussed above, in addition to these types of information, the display screens may offer a wide range of instructions and feedback to the operator. For example, FIG. 9 represents a similar display screen 174 that leads an operator to perform a fan continuity test. In particular, in the embodiment illustrated in FIG. 9, textual directions 176 are provided that require the operator to plug a fan harness into a test box and to press a start button to begin an electrical continuity test. In the pictorial portion of the screen, a fan 178 is illustrated as mounted in an electromechanical device, along with leads 180 for connecting the fan to a test device 182. Again, text may be provided clearly indicating to the operator where these elements may be found and how they should be connected. Once the test has been performed, a clear indication may be provided to the operator as to the results of the test, in this particular case the test having been passed as indicated by the field 184. As will be appreciated by those skilled in the art, various other clues, including color changes, blinking or alternating screens, and so forth may be provided for the operator. In a presently contemplated embodiment, for example, the "passed" results from a test will be illuminated in green, whereas a "failed" notice will be illuminated in red.

Figure 10:
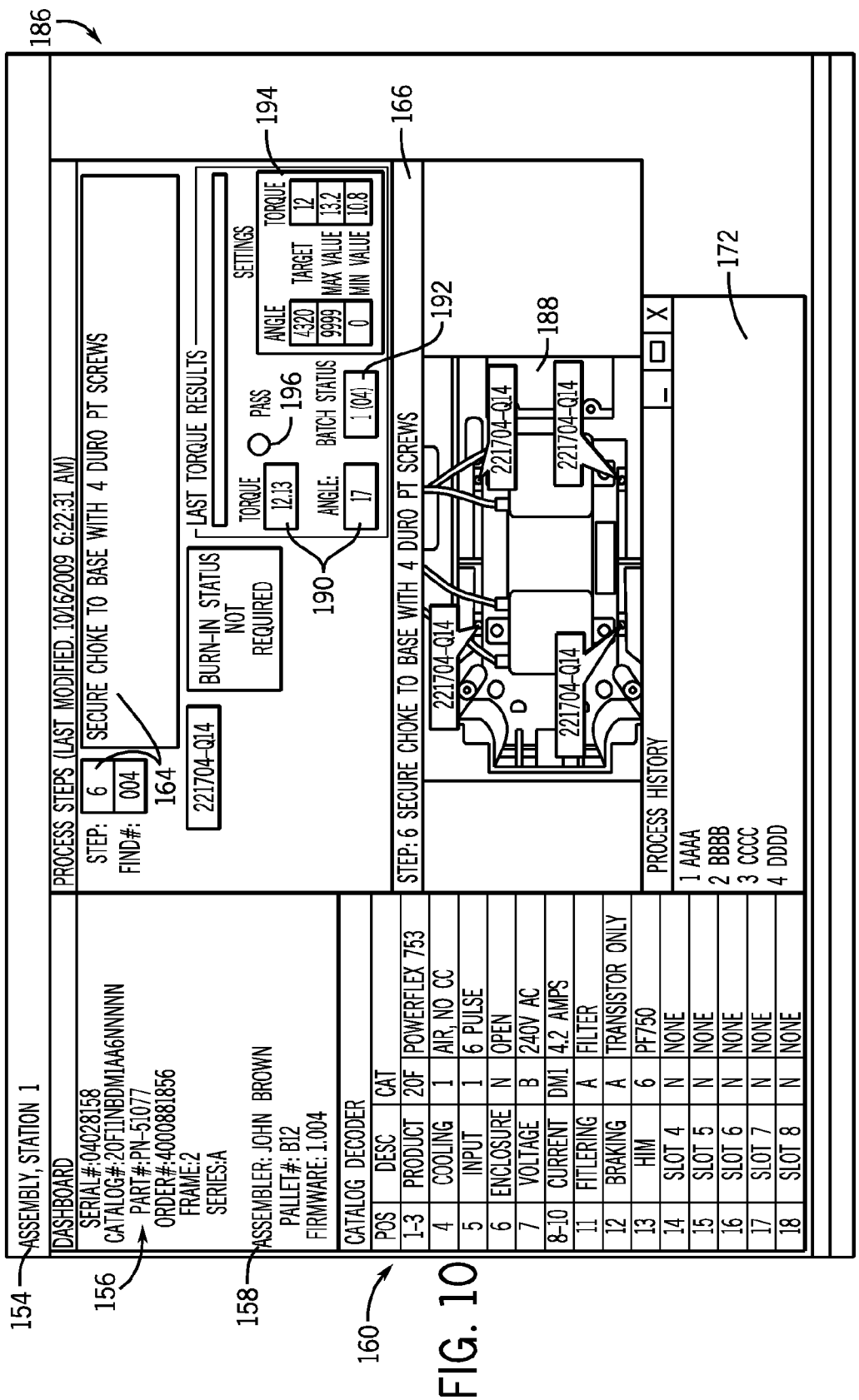
Figure 11:
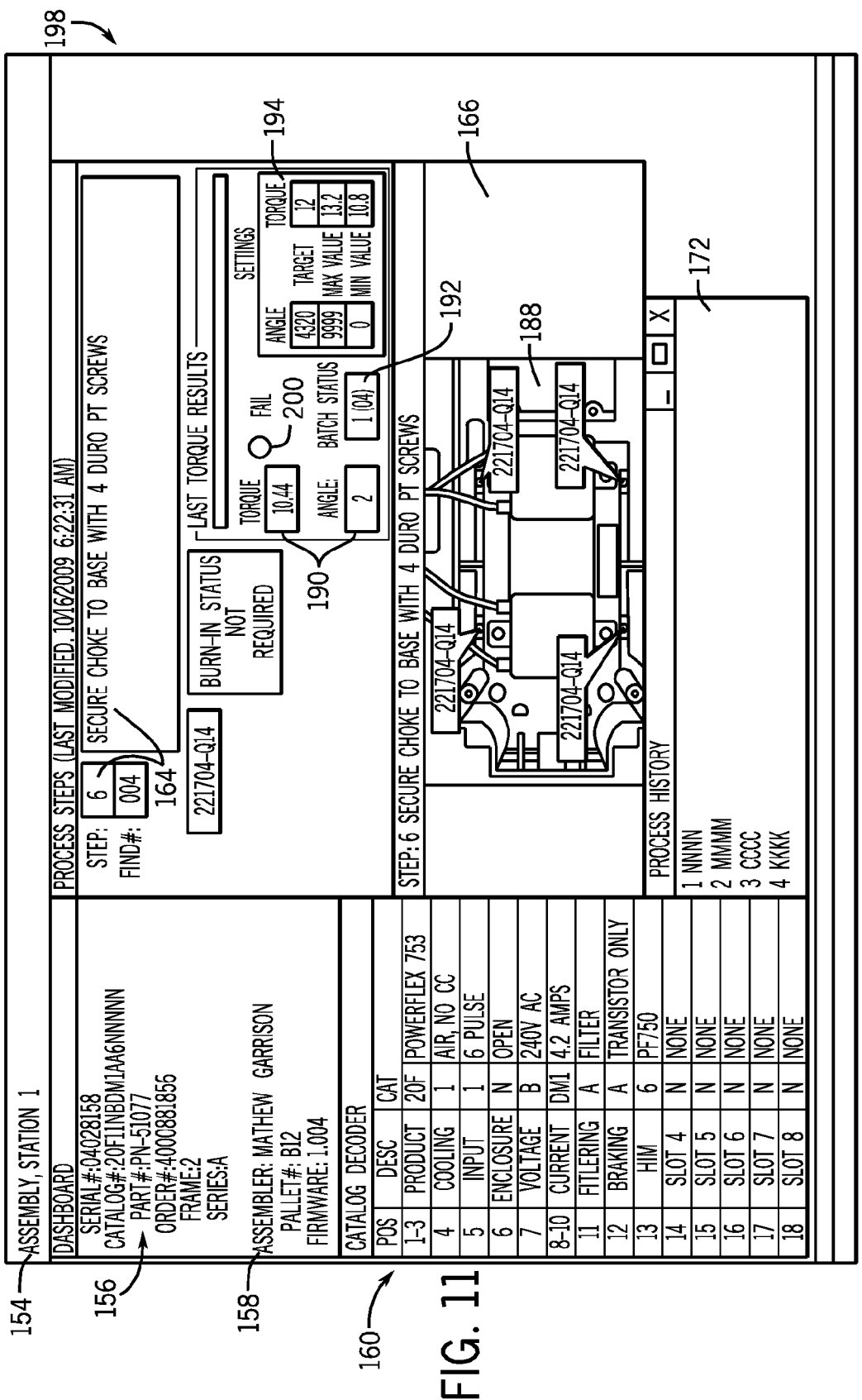

Still further, FIG. 10 illustrates a further display screen 186 that prompts an operator to insert and tighten a series of fasteners. The operation, enumerated as step "6" in field 164, is explained in text. Also, in the pictorial window 166, an image 188 of the assembly is shown with indications of where the fasteners are to be mounted. In practice, the present embodiment determines whether an appropriate attachments has been mounted on a powered tool, and the tool is controlled by the tool controller to provide the desired torque for the fasteners. The torque applied to the fastener, as well as the fastener position may be shown, as indicted by reference numeral 190, along with an indication of which fastener is being secured, as shown at reference numeral 192. The tolerance range for the assembly parameter (in this case, torque and/or position) may also be displayed, as indicted by reference numeral 194. Finally, when the target parameter is reached that falls within the desired tolerance, an indication of a successful "pass" for the operation may be displayed, as indicted by reference numeral 196. FIG. 11 illustrates a screen 198 the same operation but after which the target parameter (torque) fell outside of the desired range, as indicated by the "fail" indication 200. In such cases, the operator may be prompted to complete the operation properly before the system will move on to the subsequent processing step.

As noted above, the process and techniques described greatly facilitate the manufacture of complex products involving many processing steps. These may be carried out on the same or different products and product configurations (including special orders processed with significantly different orders). The process also facilitates operator training, tool control, and quality control, including tracking of products through the processes, tracking of parts and components, record keeping for later reliability analysis, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A manufacturing system comprising:
   a plurality of sensors at a manufacturing workstation;
   a first powered tool configured to be manipulated by a human user for carrying out a plurality of manufacturing processes;
   a second powered tool configured to be manipulated by the human user for carrying out the plurality of manufacturing processes;
   a digital display at the manufacturing workstation; and
   a control system coupled to the plurality of sensors, to the first powered tool, to the second powered tool, and to the display, the control system being configured to receive signals from the sensors and to transmit user viewable display screens to the display based upon the received signals, the display screens providing a plurality of pictorial representations of the plurality of manufacturing processes to be carried out at the manufacturing workstation and to provide an indication of which one of the first or second powered tools to use in the plurality of manufacturing processes, wherein the control system is configured to display on the digital display a set of instructions corresponding to a manufacturing process of the plurality of manufacturing processes and an alternate set of instructions corresponding to an alternate manufacturing process of the plurality of manufacturing processes, and wherein the control system is configured to select to display the set of instructions or the alternate set of instructions based on observing, via at least one of the sensors, a product bin containing a product being manufactured via the manufacturing workstation, wherein the manufacturing workstation comprises a reconfigurable manufacturing workstation configured to adapt to performing the set of instructions or the alternate set of instructions during manufacturing operations.

2. The system of claim 1, wherein at least one of the sensors is configured to provide test signals verifying whether a manufacturing process of the plurality of manufacturing processes has been successfully completed, and wherein a display screen transmitted to the display provides a user viewable indication of whether the manufacturing process has been successfully completed based upon the test signals.

3. The system of claim 1, comprising a first and a second powered tool attachment configured to attach to the first powered tool, wherein the control system is configured to provide an indication of which one of the first and second tool attachments to affix to the first powered tool, and wherein at least one of the sensors is configured to provide signals verifying the use the of proper first or second powered tool attachment.

4. The system of claim 3, wherein the first and the second powered tools are coupled to the control system, and wherein the control system is configured to enable operation of the first and the second powered tools only when the first and the second powered tools are needed for carrying out the manufacturing process of the plurality of manufacturing processes.

5. The system of claim 3, wherein the control system is configured to regulate operation of the first and the second powered tools in accordance with at least one predetermined parameter of the manufacturing process.

6. The system of claim 5, wherein the predetermined parameter is torque, speed, position, or a combination thereof.

7. The system of claim 3, wherein the control system comprises a system controller and a tool controller, the first and the second powered tools being coupled to the tool controller, the system controller being coupled to the tool controller to enable the tool controller to regulate operation of the first and the second powered tools based upon predetermined manufacturing steps programmed in the system controller.

8. The system of claim 1, comprising a plurality of manufacturing workstations, wherein the control system comprises a system controller coupled to a plurality of tool controllers at the respective manufacturing workstations.

9. The system of claim 1 wherein the control system comprises a system controller and a tool controller coupled to the system controller, the first and the second powered tools being coupled to the tool controller, wherein the system controller is configured to program the tool controller with a first program set based on a derivation that the product is being manufactured via the manufacturing process, or with a second program set based on a derivation that the product is being manufactured via the alternate manufacturing process.

10. The system of claim 1, wherein the plurality of sensors includes a sensor configured to detect an indication of a stage of manufacture of the product via the manufacturing process or the alternate manufacturing process, and wherein the control system is configured to access a display screen for the stage of manufacture and to transmit the display screen to the digital display and to transmit the indication of which one of the first and second powered tools to use in the stage of manufacture of the manufacturing process or the alternate manufacturing process.

11. The system of claim 10, wherein the indication of the stage of manufacture comprises a signal indicative of the manufacturing workstation.

12. A manufacturing system comprising:
a plurality of manufacturing workstations, each workstation comprising a plurality of sensors and a digital display;
a first powered tool configured to be manipulated by a human user for carrying out a manufacturing process or an alternate manufacturing process;
a second powered tool configured to be manipulated by the human user for carrying out the manufacturing process or the alternate manufacturing process;
wherein the plurality of sensors at each workstation includes a sensor configured to detect an indication of a stage of manufacture of the product at the respective workstation; and
a control system coupled to the plurality of sensors of each manufacturing workstation, to the first powered tool, to the second powered tool, and to the displays, the control system being configured to receive signals from the sensors, to access a display screen for the detected stage of manufacture of the product at the respective workstation, and to transmit a user viewable display screen to the display of each respective workstation based upon the stage of manufacture of the product at the respective workstation, the display screens providing a pictorial representation of one or more manufacturing processes to be carried out at the respective workstation and to provide an indication of which one of the first or second powered tools to use in the one or more manufacturing processes, wherein the stage of manufacture is included in the manufacturing process or in the alternate manufacturing process, wherein the control system is configured to display on at least one of the digital displays of the manufacturing workstations, a set of instructions corresponding to the manufacturing process and an alternate set of instructions corresponding to the alternate manufacturing process, and wherein the control system is configured to select to display the set of instructions or the alternate set of instructions based on observing, via at least one of the sensors configured to detect the indication of the stage of manufacture, a product bin containing a product being manufactured via the plurality of manufacturing workstations, wherein the plurality of manufacturing workstations comprises a plurality of reconfigurable manufacturing workstations configured to adapt to performing the set of instructions or the alternate set of instructions during manufacturing operations.

13. The system of claim 12, wherein the control system comprises a system controller and a tool controller coupled to the system controller, the first and the second powered tools being coupled to the tool controller, wherein the system controller is configured to program the tool controller with a first program set based on a derivation that the product is being manufactured via the first manufacturing process, or with a second program set based on a derivation that the product is being manufactured via the alternate manufacturing process.

14. The system of claim 12, at least one of the sensors of at least one workstation is configured to provide test signals verifying whether the manufacturing process has been successfully completed, and wherein a display screen transmitted to the display of the respective workstation provides a user viewable indication of whether the manufacturing process has been successfully completed based upon the test signals.

15. The system of claim 12, wherein at least one of the workstations comprises a first and a second powered tool attachment configured to attach to the first powered tool.

16. The system of claim 15, wherein the first and the second powered tools are coupled to the control system, and wherein the control system is configured to enable operation of the first and the second powered tools only when the first and the second powered tools are needed for carrying out the manufacturing process.

17. The system of claim 15, wherein the first and the second powered tools are coupled to the control system, and wherein the control system is configured to regulate operation of the first and the second powered tools in accordance with a predetermined parameter of the manufacturing process.

18. The system of claim 17, wherein the predetermined parameter is torque, speed, position, or a combination thereof.

19. The system of claim 15, wherein the control system comprises a system controller and a tool controller, the first and the second powered tools being coupled to the tool controller, the system controller being coupled to the tool controller to enable the tool controller to regulate operation of the first and the second powered tools based upon predetermined manufacturing steps programmed in the system controller.

20. The system of claim 12, wherein the control system comprises a system controller coupled to a plurality of tool controllers at the respective manufacturing workstations.

21. A manufacturing method comprising:
  detecting a product to be manufactured at a manufacturing workstation of a plurality of manufacturing workstations;
  detecting a stage of manufacture of the product;
  accessing a display screen for the detected product and stage of manufacture;
  transmitting a user viewable display screen to a display at the manufacturing workstation based upon the product and the stage of manufacture, the display screen providing a pictorial representation of one or more manufacturing processes to be carried out at the manufacturing workstation;
  transmitting an indication of which one of a first powered tool or a second powered tool to use in the one or more manufacturing processes;
  transmitting a user viewable set of instructions corresponding to a manufacturing process of the one or more manufacturing processes and an alternate set of instructions corresponding to an alternate manufacturing process of the one or more manufacturing processes; and
  selecting to display the set of instructions or the alternate set of instructions based on observing, a product bin containing the product being manufactured via the manufacturing workstation, wherein the manufacturing workstation comprises a reconfigurable manufacturing workstation configured to adapt to performing the set of instructions or the alternate set of instructions during manufacturing operations.

22. The method of claim 21, comprising controlling operation of the first and the second powered tools at the manufacturing workstation based upon a predetermined program for the manufacturing processes.

23. The method of claim 22, wherein operation of the first and the second powered tools are enabled only when the first and the second powered tools are needed for carrying out a programmed manufacturing process.

24. The method of claim 22, comprising regulating operation of the first and the second powered tools in accordance with a predetermined parameter of a programmed manufacturing process.

25. The method of claim 21, comprising performing a test at the manufacturing workstation to determine success or failure of a manufacturing operation, and displaying at the manufacturing workstation an indication of the success or failure of the manufacturing operation based upon the test.

* * * * *